J. Van Winkle,
Hatchet,
N° 78,344. Patented May 26, 1868.
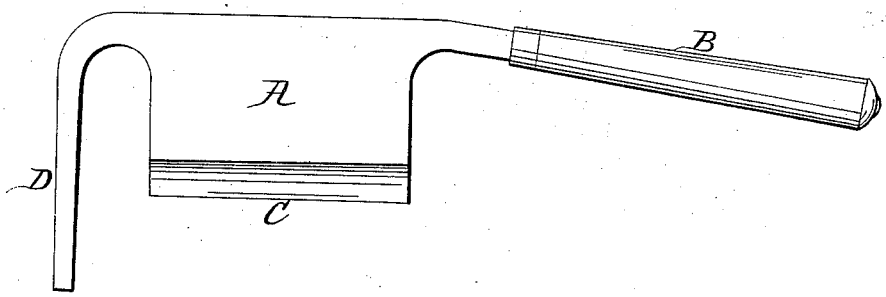
Witnesses:
W. C. Ashketter
Wm A. Morgan
Inventor:
Jno Van Winkle
per [signature]
attorneys

United States Patent Office.

JOHN VAN WINKLE, OF NEW YORK, N. Y.

Letters Patent No. 78,344, dated May 26, 1868.

IMPROVEMENT IN WOOD-CLEAVERS.

*The Schedule referred to in these Letters Patent and making part of the same.*

TO ALL WHOM IT MAY CONCERN:

Be it known that I, JOHN VAN WINKLE, of the city, county, and State of New York, have invented a new and useful Improvement in Wood-Cleaver; and I do hereby declare that the following is a full, clear, and exact description thereof, which will enable those skilled in the art to make and use the same, reference being had to the accompanying drawings, forming part of this specification.

This invention relates to a new and useful improvement in implements used in splitting the wood used in cities and other places for kindling fires and for other purposes, whereby many advantages are secured; and the invention consists in forming a cleaver or hatchet with a pendent bar or guard at its outer end, the end of which bar or guard extends below the edge of the cleaver, effectually guarding the edge of the cleaver from being dulled by contact with the hearth or with stones, and also protecting the floor, as well as the fingers of the operator, from the edge of the cleaver or hatchet, as will be hereinafter described.

The drawing represents a longitudinal side view of a cleaver, showing its form, and the manner of its construction.

A is the blade.
B represents the handle.
C is the edge.
D is the guard-bar.

In handling this implement for splitting or cutting upon a floor or hearth or upon stones, it will be seen that the end of the guard D will strike the floor, hearth, or platform, or other surface, before the edge will, thereby protecting the floor, as well as the edge of the cleaver and the fingers or hand of the operator, from injury.

The guard D may be formed on the cleaver, as seen in the drawing, or attached to it in any substantial manner.

It will be apparent that the guard may be attached to or formed on a hatchet or any similar article, when such hatchet or article is used for cleaving or for similar purposes.

I do not, therefore, confine myself to its use on cleavers, as represented in the drawing, but to hatchets and similar implements, when used for the purposes named.

Having thus described my invention, I claim as new, and desire to secure by Letters Patent—

A hatchet or cleaver, A, formed or provided with a pendent bar, D, at its forward end, said bar extending below the cutting-edge of the tool, and guarding the same from injury when in use, substantially as described.

The above specification of my invention signed by me, this twelfth day of March, 1868.

JOHN VAN WINKLE.

Witnesses:
E. MARTIN,
ALEX. F. ROBERTS.